United States Patent
Wade et al.

(10) Patent No.: US 12,328,466 B2
(45) Date of Patent: Jun. 10, 2025

(54) USER SEGMENTATION FOR MULTI-DWELLING UNIT (MDU)

(71) Applicants: DISH Network L.L.C., Englewood, CO (US); DISH Network Technologies India Private Limited, Karnataka (IN)

(72) Inventors: Joshua D. Wade, Castle Rock, CO (US); Jason Anthony Madruga, Castle Rock, CO (US); Clark Hurst Pendery, Englewood, CO (US); Dalton William Hertel, Denver, CO (US); Aaron William Schwartz, Denver, CO (US); Ryan Scribner, Erie, CO (US); Himanshu Jain, Karnataka (IN); Sandeep Kumar Bhatta, Karnataka (IN); Laxminarayana Dalimba, Karnataka (IN)

(73) Assignees: DISH Network L.L.C., Englewood, CO (US); DISH Network Technologies India Private Limited, Bengaluru (IN)

( * ) Notice: Subject to any disclaimer, the term of this patent is extended or adjusted under 35 U.S.C. 154(b) by 0 days.

(21) Appl. No.: 18/357,842

(22) Filed: Jul. 24, 2023

(65) Prior Publication Data

US 2025/0039484 A1    Jan. 30, 2025

(51) Int. Cl.
*H04N 21/454* (2011.01)
*H04N 21/214* (2011.01)
*H04N 21/258* (2011.01)
*H04N 21/431* (2011.01)

(52) U.S. Cl.
CPC .... *H04N 21/25891* (2013.01); *H04N 21/2143* (2013.01); *H04N 21/4312* (2013.01); *H04N 21/454* (2013.01)

(58) Field of Classification Search
CPC ......... H04N 21/25891; H04N 21/2143; H04N 21/4312; H04N 21/454
See application file for complete search history.

(56) References Cited

U.S. PATENT DOCUMENTS

| | | |
|---|---|---|
| 8,156,246 B2 | 4/2012 | Short et al. |
| 11,126,939 B2 | 9/2021 | Mappus et al. |
| 2009/0178071 A1 | 7/2009 | Whitehead |
| 2010/0251305 A1 | 9/2010 | Kimble et al. |

(Continued)

*Primary Examiner* — Rong Le
(74) *Attorney, Agent, or Firm* — Kilpatrick Townsend & Stockton LLP

(57) ABSTRACT

Methods and systems for provisioning content streaming services are provided. In one example, a method includes: receiving user registration data of multiple users associated with an MDU, the user registration data including a user identifier and a user experience level for each user, generating a user profile for each user, the user profile including the user registration data, viewership data, and at least one user feature, grouping the users to generate multiple user segments, each user segment including a list of users associated with the user segment and at least one common feature or attribute of the users, designating specific streaming service and content resource to each user segment, based on the common user experience level and the common feature according to a pre-defined policy, and provisioning the designated streaming service and content resource to a user of the MDU, based on the user segment to which the user belongs.

20 Claims, 11 Drawing Sheets

(56) References Cited

U.S. PATENT DOCUMENTS

| | | |
|---|---|---|
| 2011/0293277 A1 | 12/2011 | Bradea et al. |
| 2012/0079548 A1 | 3/2012 | Whitten |
| 2014/0068692 A1* | 3/2014 | Archibong ......... H04N 21/6334 |
| | | 725/116 |
| 2014/0089182 A1 | 3/2014 | Short et al. |
| 2014/0244778 A1 | 8/2014 | Wyatt et al. |
| 2017/0094356 A1* | 3/2017 | Mathews ............. H04N 21/812 |
| 2017/0272196 A1 | 9/2017 | Davidson, Jr. et al. |
| 2019/0268633 A1 | 8/2019 | Jayawardene et al. |
| 2019/0268762 A1 | 8/2019 | Bestermann et al. |
| 2019/0303562 A1 | 10/2019 | Masputra et al. |
| 2020/0236414 A1* | 7/2020 | Rhoads ............ H04N 21/42684 |
| 2023/0144753 A1 | 5/2023 | Jayawardene et al. |

* cited by examiner

500

```
┌─────────────────────────────────────────────────────────────┐
│ Receive user registration data of multiple users associated │
│ with an MDU, the user registration data including user      │
│ identifier and user experience level for each user          │
│                                                        502  │
└─────────────────────────────────────────────────────────────┘
                              │
                              ▼
┌─────────────────────────────────────────────────────────────┐
│ Generate a user profile for each user, the user profile     │
│ including the user registration data, viewership data, and  │
│ at least one user feature                                   │
│                                                        504  │
└─────────────────────────────────────────────────────────────┘
                              │
                              ▼
┌─────────────────────────────────────────────────────────────┐
│ Group the users to generate multiple user segments, each    │
│ user segment including a list of users associated with the  │
│ user segment and at least one common feature or attribute   │
│ of the users                                                │
│                                                        506  │
└─────────────────────────────────────────────────────────────┘
                              │
                              ▼
┌─────────────────────────────────────────────────────────────┐
│ Designate specific streaming service and content resource   │
│ to each user segment, based on the common user experience   │
│ level and the common feature according to a pre-defined     │
│ policy                                                 508  │
└─────────────────────────────────────────────────────────────┘
                              │
                              ▼
┌─────────────────────────────────────────────────────────────┐
│ Provide the designated streaming service and content        │
│ resource to a user of the MDU, based on the user segment    │
│ to which the user belongs                                   │
│                                                        510  │
└─────────────────────────────────────────────────────────────┘
```

FIG. 5

USER SEGMENTATION FOR MULTI-DWELLING UNIT (MDU)

BACKGROUND OF THE DISCLOSURE

A multi-dwelling unit (MDU) such as a hotel often provides content streaming services for the users (e.g., tenants, residents, guests, staffs, employees, etc.) within the MDU. However, users in the same MDU may have different preferences for the type of content they want to stream, and if the content streaming service is not diversified, users may receive content that is not relevant to their interests or needs, leading to poor user experiences. In addition, provisioning the same content streaming service to all users of an MDU can result in inefficient resource allocation. Users who do not use the service will consume resources that could be used by other users who request the service. Thus, there is a need for improving content streaming service and user viewing experience in an MDU environment.

BRIEF SUMMARY OF THE DISCLOSURE

In accordance with some embodiments of the present disclosure, a method is provided. In one example, a method includes: receiving user registration data of a plurality of users associated with a multi-dwelling unit (MDU), the user registration data including a user identity and registration information for each one of the plurality of users, generating a plurality of user profiles respectively for the plurality of users, each user profile including the user registration data, a user experience level of the user, and at least one user feature of the corresponding user, generating a plurality of user segments and associating one or more of the plurality of users to each user segment, based on a common user experience level shared among the users of the user segment or at least one common user feature shared among the users of the user segment, designating content streaming service and content resource to each user segment, based on the common user experience level or the common user feature, generating a user segment profile for each user segment, the user segment profile including the user identity of each user, the common user experience level, the common user feature, and the designated streaming service and content resource, and in response to a user request sent from a user device of the MDU, provisioning the designated streaming service and content resource to the user device, based on the user segment profile to which the user of the user device belongs. The method may be implemented by a computer device or system.

In accordance with some embodiments of the present disclosure, a system for provisioning content streaming service for an MDU is provided. In one example, the system includes: one or more processors and a computer-readable storage media storing computer-executable instructions. The computer-executable instructions, when executed by the one or more processors, cause the system to: receive user registration data of a plurality of users associated with a multi-dwelling unit (MDU), the user registration data including a user identity and registration information for each one of the plurality of users, generate a plurality of user profiles respectively for the plurality of users, each user profile including the user registration data, a user experience level of the user, and at least one user feature of the corresponding user, generate a plurality of user segments and associate one or more of the plurality of users to each user segment, based on a common user experience level shared among the users of the user segment or at least one common user feature shared among the users of the user segment, designate content streaming service and content resource to each user segment, based on the common user experience level or the common user feature, generate a user segment profile for each user segment, the user segment profile including the user identity of each user, the common user experience level, the common user feature, and the designated streaming service and content resource, and in response to a user request sent from a user device of the MDU, provision the designated streaming service and content resource to the user device, based on the user segment profile to which the user of the user device belongs.

In accordance with some embodiments, the present disclosure also provides a non-transitory machine-readable storage medium encoded with instructions, the instructions executable to cause one or more electronic processors of a system to: receive user registration data of a plurality of users associated with a multi-dwelling unit (MDU), the user registration data including a user identity and registration information for each one of the plurality of users, generate a plurality of user profiles respectively for the plurality of users, each user profile including the user registration data, a user experience level of the user, and at least one user feature of the corresponding user, generate a plurality of user segments and associate one or more of the plurality of users to each user segment, based on a common user experience level shared among the users of the user segment or at least one common user feature shared among the users of the user segment, designate content streaming service and content resource to each user segment, based on the common user experience level or the common user feature, generate a user segment profile for each user segment, the user segment profile including the user identity of each user, the common user experience level, the common user feature, and the designated streaming service and content resource, and in response to a user request sent from a user device of the MDU, provision the designated streaming service and content resource to the user device, based on the user segment profile to which the user of the user device belongs.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5 is a flow diagram illustrating an example method for provisioning content streaming service to a user of an MDU, according to various embodiments.

DETAILED DESCRIPTION OF THE DISCLOSURE

The present disclosure provides devices, systems, and methods for provisioning content streaming services to users of an MDU. One insight provided in the present disclosure is related to user segmentation and personalization of content streaming services for users of an MDU. According to some embodiments of the present disclosure, a method includes receiving user registration data for users associated with an MDU, generating a user profile for each user, grouping users into multiple segments based on common user experience level and common features, designating streaming service and content resources to each user segment based on a pre-defined policy, generating a user segment profile for each segment, and provisioning designated streaming services and content resources in response to user requests.

The present method can provide at least the following benefits. By segmenting users based on their user experience levels, features, characteristics, and preferences, content streaming services can provide personalized content recommendations and a more tailored user experience. This can help to increase user engagement and satisfaction. User segmentation can also help content streaming service providers understand the needs and preferences of different user groups, allowing them to offer more relevant and targeted content. In addition, user segmentation according to the present disclosure can help content streaming services allocate resources more effectively, which can potentially result in more efficient use of resources and cost savings.

Figure 1:
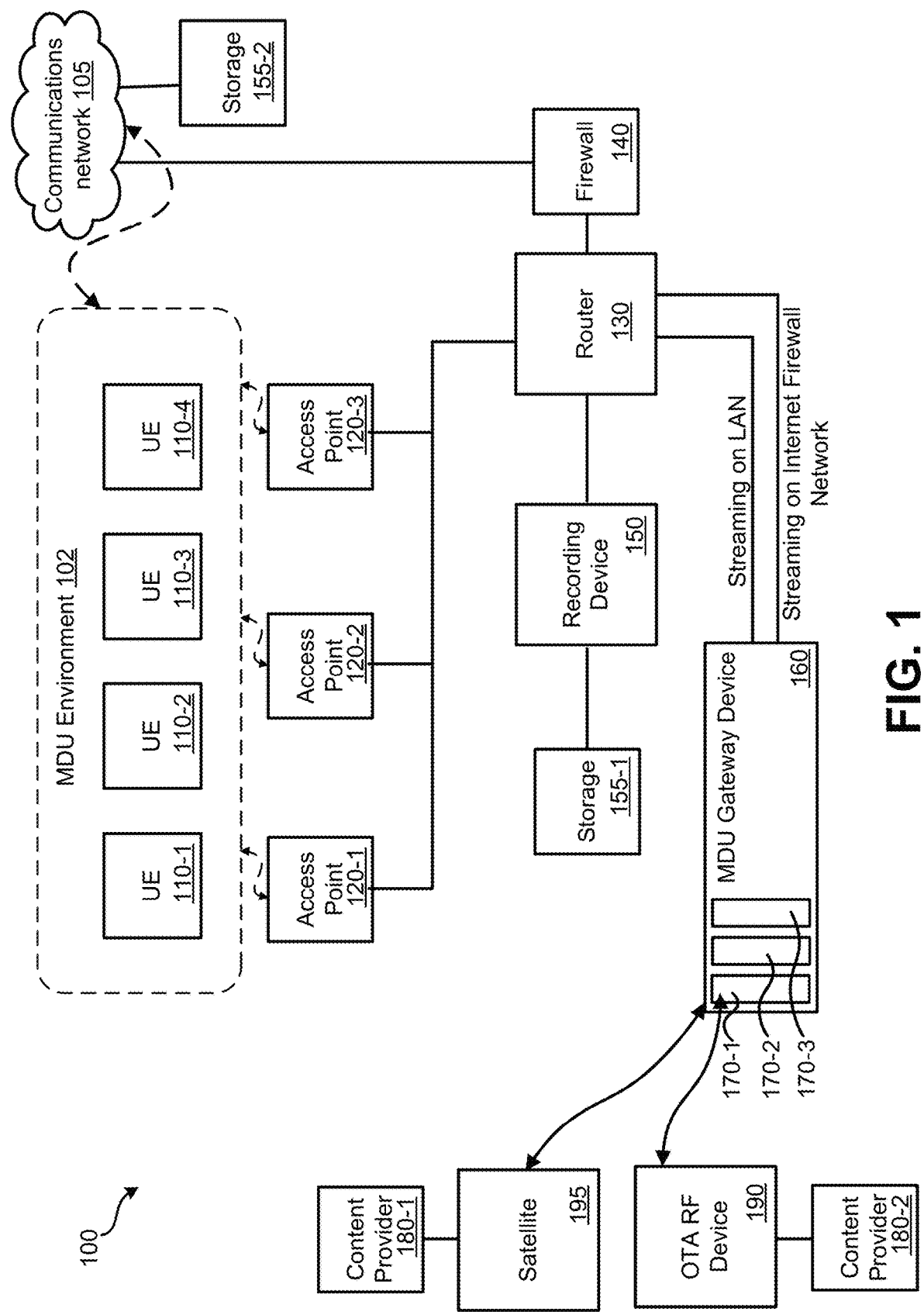
FIG. 1 is a schematic diagram illustrating an example of a communications system according to various embodiments.

FIG. 1 is a schematic diagram illustrating an example of a communications system 100 (also referred to as "system 100") for provisioning content streaming service and content resources to users of an MDU, according to various embodiments. In the illustrated example, the system 100 includes, among other components, multiple user equipments (UEs) 110 (or user devices 110) in an MDU environment 102 (also referred to as "MDU 102"), a communications network 105, multiple access points 120, an MDU gateway device 160, a recording device 150, a storage device 155, a router 130 (or a network traffic routing device or the like), and a firewall 140.

The MDU 102 used herein refers to a residential building or complex that contains multiple compartments or separate living units within a single structure. Examples of MDUs include apartment buildings consisting of multiple individual apartments within a single building, condominiums in which individual units are owned by their occupants but the common areas and facilities are shared, townhouses or similar buildings with multi-story units, co-operative housing that operates under a different ownership and governance model in which the residents collectively manage the property, duplexes and triplexes, hotels, motels, dormitories, downtown lofts, a senior living center, a college or university campus, an apartment complex.

Multiple UEs 110 (e.g., 110-1, 110-2, 110-3, 110-4, etc.) are located within the MDU environment 102. The UEs may be owned, operated, controlled by various users across the multiple units of the MDU 102. A household or a user of each unit of the MDU 102 may have one or more UEs. The users within the same MDU 102 may not share their UEs. However, UEs within one single unit of the MDU 102 may be interconnected through a local network (not illustrated) such as a wireless network or a wired network. The UE 110 is generally used by the user to access the communications network 105 to receive, stream, play, and present media content from any content resources internal within the MDU 102 and external to the MDU 102 (e.g., from a content provider). Examples of UE 110 include televisions (TV) and smart TVs, user devices, set top boxes, satellite set top box, gaming consoles, smartphones, tables, wearables, streaming sticks, smart projectors, virtual reality and augmented reality (VR/AR) devices, integrated receiver decoders, and so on. In a hotel MDU, the UEs 110 may be a fixed UE such as a TV permanently installed in a unit or an area of the MDU 102 or a mobile user device carried along with a user. The UEs 110 may communicate with the MDU gateway device 160 and/or access the communications network 105 through one or more access points 120 (e.g., 120-1, 120-2, 120-3, etc.).

The access points 120 are generally network devices that extend the network coverage within the MDU 102, enable the UEs 110 to connect to the MDU gateway device 160, and enable the UEs 110 to access the communications network 105. In some embodiments, an access point (e.g., 120-1) may be installed within one unit of the MDU 102 and exclusively used by UEs within the unit. Alternatively, an access point may be installed in a common area of the MDU 102 and shared by UEs across various units of the MDU 102.

The MDU gateway device 160 functions as a central hub for the communication of UEs 110 of the individual units within the MDU 102. In some embodiments, the MDU gateway device 160 is installed in the MDU 102 by the MDU administrator (e.g., a property manager). Among other capabilities, the MDU gateway device 160 is configured to receive content from content providers, transfer the content to the UEs 110, record the content to generate a shared copy of the content, and delivery the shared copy of content to an authorized and eligible UE 110 within the MDU 102 in response to a request.

The MDU gateway device 160 may be in communication with content providers 180 (i.e., 180-1, 180-2, etc.) through data transmission devices, such as over-the-air (OTA) radio frequency (RF) device 190 or satellite 195. Satellite 195 may be used to transmit content to the MDU gateway device 160 over television and radio broadcasting, as well as for internet access in remote areas where traditional wired connections are not available. On the other hand, the OTA RF device 190 may be used to transmit content to the MDU gateway device 160 over a wireless network, such as Wi-Fi or cellular networks. In some embodiments, the content provider is a commercial streaming service provider such as SLINGTV® or DISH DBS®. In some embodiments, the MDU gateway device 160 is included in a content delivery system (e.g., the content delivery system 206 of FIG. 2A). Other content delivery and recording systems are also within the scope of the present disclosure.

Alternatively, in other embodiments, the MDU gateway device 160 may be in connection with a head end (not shown) separate from the MDU gateway device 160. The head end (e.g., a branded smart box of a content provider, or a smart box designed and provided by a third party) is in communication with the content providers 180 and is configured to receive content from the content providers 180 and further transmit the content to the MDU gateway device 160. In other words, the MDU gateway device 160 may receive content from the content provider 180 via the separate head end.

The MDU gateway device 160 may include one or more origin servers 170 (e.g., 170-1, 170-2, 170-3, etc.) configured to stream the content received from the content providers 180. The origin server 170 includes a hardware component used to enable streaming or content over either a local area network (LAN) or a wide area network (WAN). The origin server may include a specialized processing unit designed to handle streaming traffic with low latency and high throughput. The origin server 170 can be used to support various types of streaming protocols and codecs, including popular protocols such as HTTP Live Streaming (HLS), Real Time Messaging Protocol (RTMP), Real Time Messaging Protocol (RTMP), Multicast IP based Streaming, and Dynamic Adaptive Streaming over HTTP (DASH). The origin server 170 can also support different quality levels and resolutions to accommodate different network conditions and device capabilities.

The router 130 is configured to facilitate communications between the UEs 110 and the MDU gateway device 160, the recording device 150, and the storage device 155 within the MDU 102. The router 130 can be connected to the MDU gateway device 160 either through a wired or wireless connection. Once connected, the router 130 can assign unique IP addresses to each UE 110 or access points 120 within the network, allowing them to communicate with each other and with devices outside the network. The content received by the MDU gateway device 160 may be distributed to the UEs 110 and other devices within the MDU 102 (e.g., the recording device 150) via the router 130 through LAN streaming.

The firewall 140 (also referred to as "network firewall 140") connected to the communications network 105 is configured to monitor and control incoming and outgoing network traffic to prevent unauthorized access or attacks from outside the MDU 102. In some embodiments, the firewall is integrated to or installed on the MDU gateway device 160 that connects the internal network of the MDU 102 to the communications network 105. The firewall 140 may be in a form of a physical hardware device, a software-based firewall running on the MDU gateway device 160, or a combination thereof. In some embodiments, the firewall 140 may also provide additional features such as Quality of Service (QOS) control, which can prioritize network traffic for certain applications to ensure smooth and consistent performance for content streaming and sharing. In some embodiments, the content received by the MDU gateway device 160 is distributed to the UEs 110 and other devices within the MDU 102 (e.g., the recording device 150) via the firewall 140 through WAN streaming.

The recording device 150 is connected to the MDU gateway device 160 via the router 130. The recording device 150 is configured to record the content received by the MDU gateway device 160 and generate a copy of the content. The copy of the content may be stored in a storage device 155. The storage device 155 may be a local device (e.g., 155-1) within the MDU 102 or a cloud storage device (e.g., 155-2) connected to the communications network 105. The copy of the content stored in the storage device 155 is accessible by the UEs 110 via the router 130 (e.g., through LAN streaming) or via the communications network 105 through network streaming. Examples of the recording device 150 include but are not limited to Digital Video Recorder (DVR), Network Video Recorder (NVR), Video On Demand (VOD) server, media server, cloud-based recording service.

In some embodiments, the recording device 150 is a smart edge server located within the MDU 102 and close to the UEs 110. The smart edge server is configured to record contents and stored the recorded contents locally at the edge (i.e., the MDU 102) of the network. Smart edge servers can be used to reduce latency and improve performance for applications that require real-time or near-real-time data processing within the MDU 102.

In some embodiments, the MDU gateway device 160 is in connection with a head end (not shown) separate from the MDU gateway device 160 and is configured to receive content from the content provider 180 via the head end. The recording device 150 may be included in the MDU gateway device 160 or configured as an internal device/function of the MDU gateway device 160.

Figure 2A:
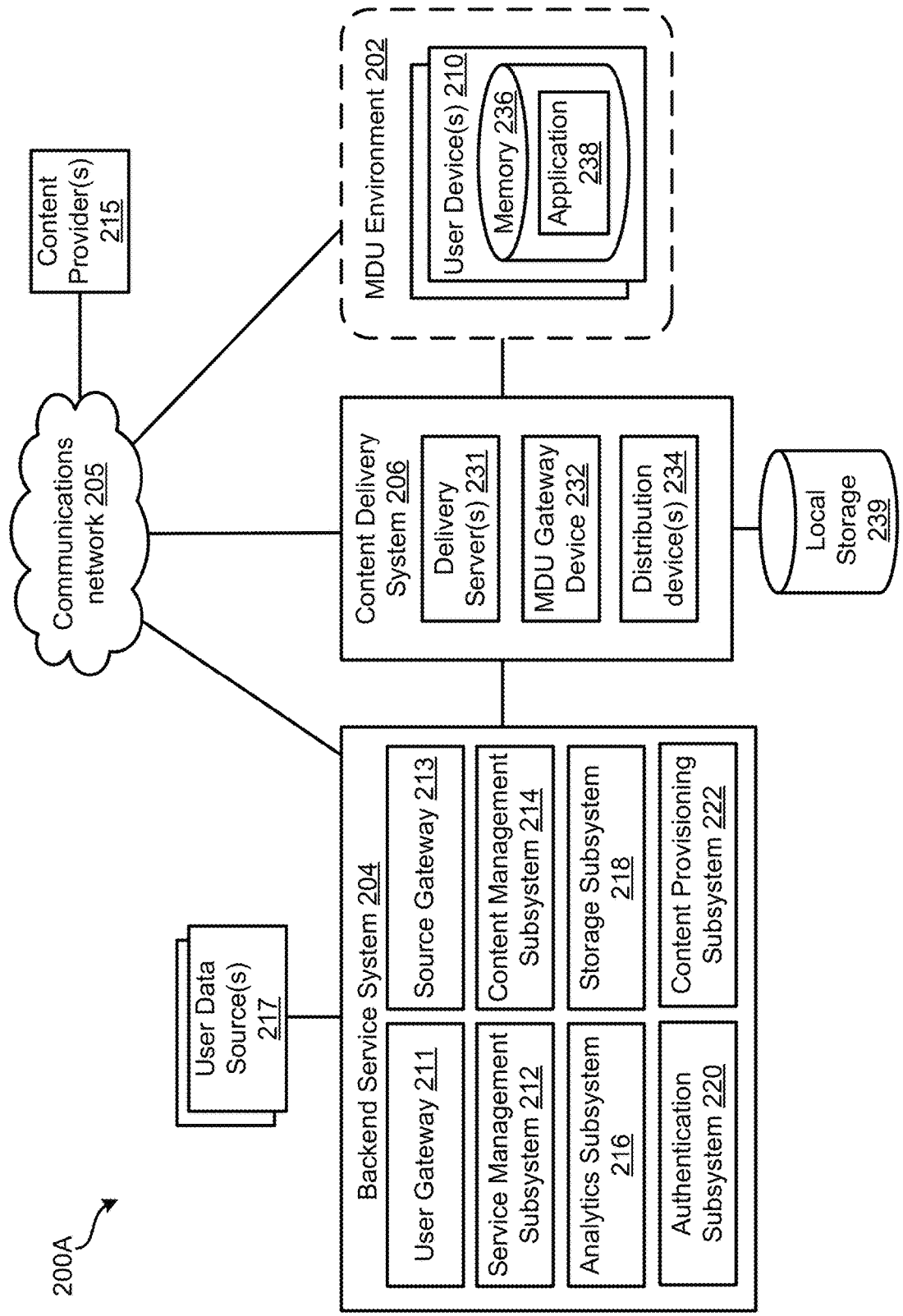
FIG. 2A is a schematic diagram illustrating another example of a communications system according to various embodiments.

FIG. 2A is a schematic diagram illustrating another example of a communications system 200A (also referred to as "system 200A") according to various embodiments. The system 200A is a variation of the system 100 and may include one or more component of the system 100. In the illustrated example, the system 200 includes, among other components, an MDU environment 202, a backend service system 204, a communications network 205, a content delivery system 206. Various components included in the system 200A may communicate with each other via the communications network 205. The system 200A may include additional components and/or network functions.

The backend service system 204 includes, among other components, a user gateway 211, a source gateway 213, a service management subsystem 212, a content management subsystem 214, an analytics subsystem 216, a storage subsystem 218, an authentication subsystem 220, and a content provisioning subsystem 222. The content delivery system 206 includes, among other components, one or more delivery servers 231, an MDU gateway device 232, and one or more distribution device(s) 234.

The communications network 205 can include one or a combination of networks (wireless or wireline) that permit one-way and/or two-way communication of data and/or signaling. The media content can include, for example, 2D content, 3D content, or 4D content or another type of immersive content and media content. Besides media content that is static and, thus, can be consumed in time-shifted fashion, media content that can be created and consumed contemporaneously also is contemplated.

The media content can be transmitted to and received by a user device 210 (i.e., a UE 110 of FIG. 1) of a group of user device(s) 210 in the MDU environment 202. The user device 210 can consume the content as part of a presentation that is individual or as part of a presentation involving multiple parties. Regardless of its type a presentation can take place within a session to consume content. Such a session can include, for example, a call session, videoconference, a watch party, a downstream lecture, a broadcast in a common area of the MDU, such as a seminar, a class, a tutorial, or the like, for example.

The user device(s) 210 are similar to the UEs 110 of FIG. 1 and can include various types of user devices, each having a particular amount of computing resources (e.g., processing resources, memory resources, networking resources, and I/O elements) to play/stream/present media content via a presentation. In some cases, the user device(s) 210 can be devices of a particular type, such as high-end to medium-end mobile devices or wearable devices. A mobile device can be embodied in, for example, a handheld portable device (e.g., a smartphone, a tablet, or a gaming console); a non-handheld portable device (e.g., a laptop); a tethered device (such as a personal computer). A wearable device can be embodied in goggles (such as augmented-reality (AR) goggles) or a helmet mounted display device, for example.

To stream media content, a user device 210 can execute a client application 238 retained in a memory device 236 that can be present in the user device 210. A processor (not shown in FIG. 2A) integrated into the user device 210 can execute the client application 238. The client application 238 can include a mobile application or a web browser, for example. Execution of the client application 238 can cause initiation of a streaming session. Accordingly, execution of the client application 238 can result in the exchange of data and/or signaling with the backend service system 204 via a user gateway 207 included in the backend service system 204. The user device 210 and the user gateway 211 can be functionally coupled by the communications network 205. Specifically, the user device 210 can receive data defining the media content. Such data can be embodied in one or multiple streams defining respective elements of the media content. For instance, a first stream can define imaging data corresponding to video content, and a second stream can define audio data corresponding to an audio channel of the media content. In some cases, a third stream defining haptic data also can be received. The haptic data can dictate elements of 4D content or another type of immersive content.

The user gateway 211 can directly communicate with the user device 210 and provide data defining the media content by communicating with the content delivery system 206. In some embodiments, the user gateway 211 can receive user information from the user device 210. For example, the user information can include user onboarding information, a user request for content streaming service or content resource, user authentication information, and so on. The content provisioning subsystem 222 is in connection with the content delivery system 206 and can provide content streaming service, in response to a user request, to the authenticated and authorized user device 210 via the user gateway 211 and the content delivery system 206. In some embodiments, a request or instruction for content delivery is generated by the content provisioning subsystem 222 and sent to the content delivery system 206, and the content delivery system 206 delivers media content to the user device 210 according to the instruction.

The authentication subsystem 220 can manage authentication, authorization, and accounting of the user of the MDU. In some embodiments, the authentication subsystem 220 can automatically retrieve user registration information, for example, user profiles stored in the storage subsystem 218 upon a user request for content streaming service. The authentication subsystem 220 can perform the authentication process to authenticate the onboarding user prior to delivery of media content to the user.

The content delivery system 206 may employ a content delivery network (CDN) to retrieve content from a content provider 215 and deliver the content to the user device 210 according to the request/instruction. In some embodiments, one or more delivery servers 221 included in the content delivery system 206 can have a local instance of media content to be provided to the user device 210. The local instance of media content can be obtained from one or several local storage devices 239, where each one of the local storage devices 239 contain media assets. Such media assets can be static and can be consumed in time-shifted fashion. The media assets can include, for example, a video segment, a webcast, an RSS feed, or another type of media content that can be streamed by the user gateway 211 and/or other devices of the backend service system 204. The media assets are not limited to media content that can be streamed. In some cases, at least some of the media assets can include static media content, such as an image or a document. In some embodiments, the media assets include a recording of a content item that can be shared by the users of the MDU 202 (also referred to as a "shared recording"). In some embodiments, the MDU gateway device 232 of the content delivery system may retrieve an identified media assets stored in the local storage device 239 and delivery the identified media assets to the user device 210 according to the instruction sent from the backend service system 204.

The source gateway 213 serves as an entry point for incoming data, information, or request from external sources such as user data sources 217. The source gateway 213 is configured to receive incoming data, information, or request, and transfer the data to other subsystems of the backend service system 204. In some embodiments, the user data source 217 may be associated with a data center of a management system of the MDU 202. The user data source 217 can provide user data or information related to the MDU, such as user identity, MDU account information, user registration data, and so on. In some embodiments, the user data source 217 may be associated with content provider(s) 215, such as a commercial content streaming service provider. The user data source 217 may include user viewership data and user analytics data, etc. In some embodiments, the user data source 217 is operated by the MDU management. In some embodiments, the data source is operated by a third party that is different from the operator of the backend service system 204. In some embodiments, the user data source 217 is associated with a hospitality property management system platform 301 shown in FIG. 2C, which will be described in detail below.

The user gateway 211 is in connection with the particular delivery server 231, which can provide media content to the user device 210 in response to a user request for content. In some embodiments, the backend service system 204 can retrieve the requested media content from the content provider 215 and send the media content to the user device 210 through the user gateway 211 and the content delivery system 206. The user gateway 211 can send the media content according to one of several communication protocols (e.g., IPv4 or IPv6, for example). In some embodiments, the delivery server 231 can retrieve media content requested by the user directly from the local storage device 239 according to the instruction from the backend service system 204 and send the media content to the user device 210 through the MDU gateway device 232 and the distribution device 234.

In some embodiments, the media content that is available to a user device 210 or set of multiple user devices 210 can be configured by content management subsystem 214. To that end, the content management subsystem 214 can identify corpora of media content applicable to the user device(s) 210. Execution of the client application 238 can result in access to a specific corpus of media content based on attributes of the user device 210 or a combination of the set of multiple user devices 210. In some embodiments, the content management subsystem 214 can configure one or more functions to interact with media content. Those function(s) can include, for example, one or a combination of translation functionality (automated or otherwise), social-media distribution, formatting functionality, or the like.

The analytics subsystem 216 can generate intelligence and/or knowledge about user registration information, user features, attributes, interests, and characteristics, user viewing preferences, content consumption behavior of a user device (e.g., one of the user devices 210), etc. The analytics subsystem 216 can retain the intelligence and/or knowledge in a storage subsystem 218. In some embodiments, the intelligence and knowledge may include the user registration information related to MDU, such as username, MDU membership, user registration number, MDU booking (reservation) number and type, one or more user identities related to the user, MDU account information of the user, user experience level, and so on. The analytics subsystem 216 may process the user registration information related to MDU and extract one or more user features therefrom.

In some embodiments, the intelligence and knowledge can be generated using historical user activity data identifying one or different types of viewer activities and user behaviors related to the user device 210. The user activities can be related to consumption of media content. In some configurations, the client application 238 can send user activity data during consumption of media content. The activity data can identify an interaction or a combination of interactions of the user device 210 with the media content. An example of an interaction is trick play (e.g., fast-forward or rewind) of the media content. Another example of an interaction is reiterated playback of the media content. Another example of an interaction is aborted playback. e.g., playback that is terminated before the endpoint of the digital content. Yet another example of the interaction is submission of the media content to a user account in a social media platform. Yet another example of the user activity is the video recording behavior of the user on the user device. Thus, the activity data can characterize engagement with the media content.

In some embodiments, the user activity data is supplied by a third party (e.g., a commercial content provider) to which the user subscribes to. The user activity data may be received on the backend service system 204 via the source gateway 213 and stored in the storage subsystem 218. In some embodiments, the user activity data provided by the content provider may include DVR analytics data related to the user, including favorite channel list, viewing history information, type of show watched within a predetermined time period, genre of movies watched within a predetermined time period, number of recordings scheduled by the user, number of recordings completed by the user, number of recordings deleted by the user, amount of storage space used by the user, average length of recordings by the user, time of day when the user schedules most recordings, most commonly recorded shows or channels by the user.

The analytics subsystem 216 may process the user activity data and extract one or more features therefrom. In some embodiments, one or more features can be extracted from a combination of the user registration data and user activity data.

In some embodiments, the analytics subsystem 216 can utilize the user activity data to assess a degree of interest of the user on the media content (e.g., media assets). In some embodiments, the analytics subsystem 216 can train a machine learning model to discern a degree of interest on media content among multiple interest levels. The machine learning model can be trained using unsupervised training, for example, and multiple features determined using media content and the user activity data. By applying the trained machine learning model to new activity data, a user interest (attribute, feature, or characteristic) can be generated. A user feature (attribute, interest, or characteristic) may represent one of the multiple interest levels and, thus, quantifies interest on the media content on part of the user.

By evaluating the user information, interest, attribute, feature, or characteristic of a user of MDU on different types of media content, the analytics subsystem 216 can generate a user profile for the user. Such an evaluation can be implemented for multiple users of the MDU and therefore multiple user profiles can be generated. The analytics subsystem 216 may further group the multiple users based on a common user feature (attribute, interest, or characteristic) shared among users. Multiple user segments profiles may be generated, each user segment profile including a list of users sharing at least one common user feature (attribute, interest, or characteristic). The user profiles and user segment profiles may be stored in a database included in the storage subsystem 218.

Figure 2B:
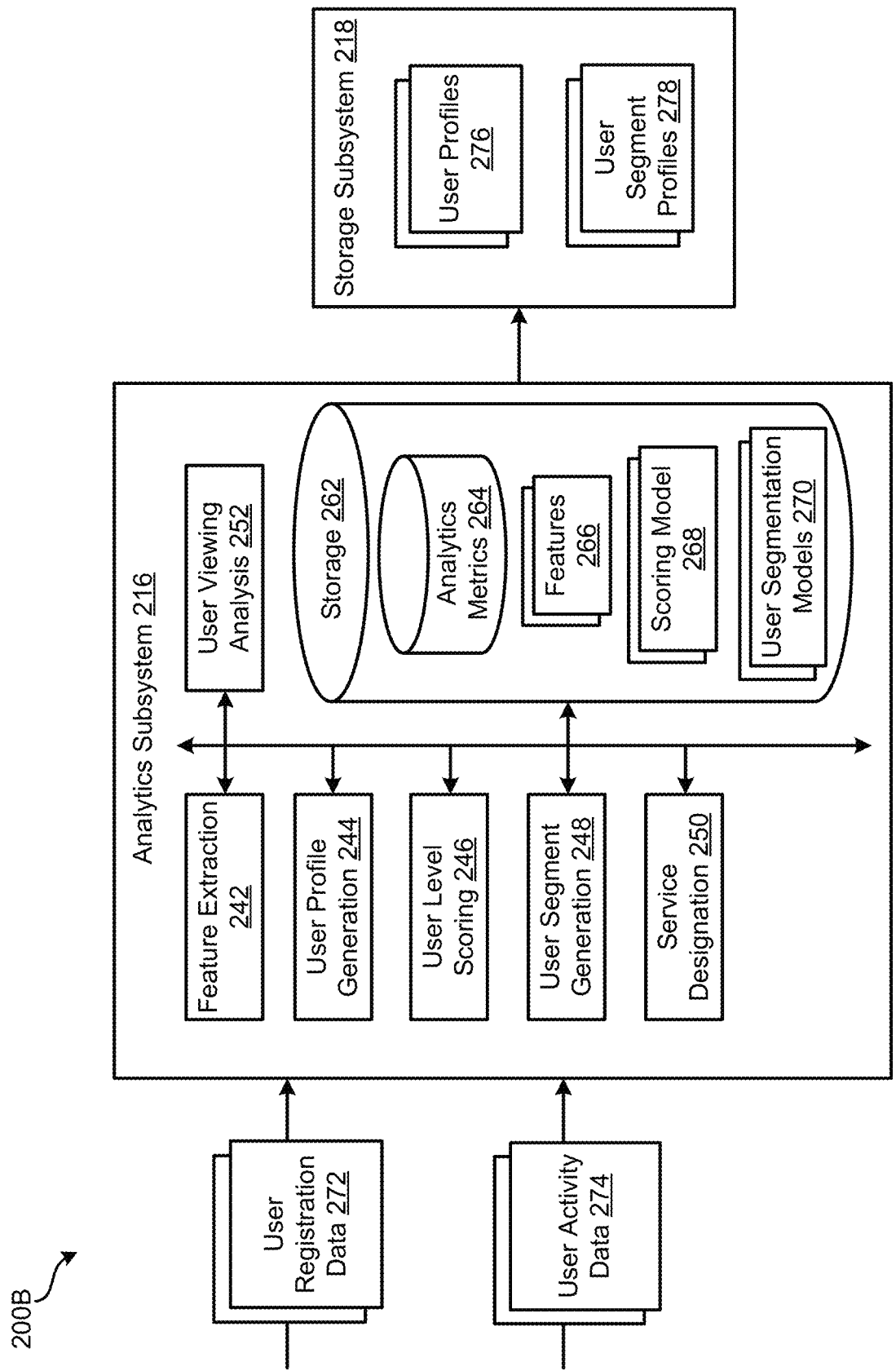
FIG. 2B is a schematic diagram illustrating another example of a communications system according to various embodiments.

FIG. 2B is a schematic diagram illustrating an example of a communications system 200B (also referred to as "system 200B") including the analytics subsystem 216 and the storage subsystem 218 of the backend service system 204. The system 200B may include additional components and/or functions. As shown in FIG. 2B, the analytics subsystem 216 includes, among other components, a feature extraction unit 242, a user profile generation unit 244, a user level scoring unit 246, a user segment generation unit 248, service designation unit 250, a user viewing analysis unit 252, and a storage 262.

The analytics subsystem 216 can receive user registration data 272 and user activity data 274 from external user data sources 217 as mentioned above. The feature extraction unit 242 is configured to extract a user feature 266 from the user registration data 272 and user activity data 274. In some embodiments, the feature extraction unit 242 can preprocess the user registration data 272 and user activity data 274 to transform and integrate the data. The feature extraction unit 242 can select a subset of relevant features that can capture the user's behavior and preferences based on the user's personal information or identities (e.g., age, gender, ethnicity, location, socio-economic level, user experience level, user characteristics such as internal/external or employee/guest, MDU membership level, etc.) and engineer the features to create a new user feature in compliance with a standard format. The extracted user features can be represented in a format that can be used as input to machine learning models. For example, a feature vector may be created corresponding to a dimension in the vector.

The user viewing analysis unit 252 is configured to analyze the user activity data 274 to facilitate the extraction of user features from user viewing preference. In some embodiments, the user viewing analysis unit 252 can use certain analytical metrics 264 stored in the storage 262 to measure the user activity. The certain analytical metrics 264 may include viewing history, time spent, ratings and reviews, search queries, watchlist and favorite list, clickstream, recording history, to name a few. Additional metrics may also be included in the analytical metrics.

For example, viewing history can be used to measure the types of content that the user has viewed in the past, including the genre, format, language, and duration of the content. Time spent can be used to measure the amount of time that the user spends watching a particular type of content, such as movies, TV shows, or sports. Ratings and reviews can be used to measure the ratings and reviews that the user has given to different types of content, indicating their level of interest and engagement. Search queries can be used to measure the keywords and phrases that the user has used when searching for content, providing insights into their interests and preferences. Watchlist and favorite list can be used to measure the content that the user has added to their watchlist or favorite list, indicating their future viewing preferences. Clickstream data can be used to measure the user's clicks and navigation behavior on the platform, indicating their preferences and interests. Recording history can be used to measure the user's recording behavior on the platform, indicating their watch and record habit. The feature extraction unit 242 can generate one or more features of user viewing preference based on these measurements provided by user viewing analysis unit 252. The user features 266 generated by the feature extraction unit 242 can be stored in the storage 262.

Figure 2D:
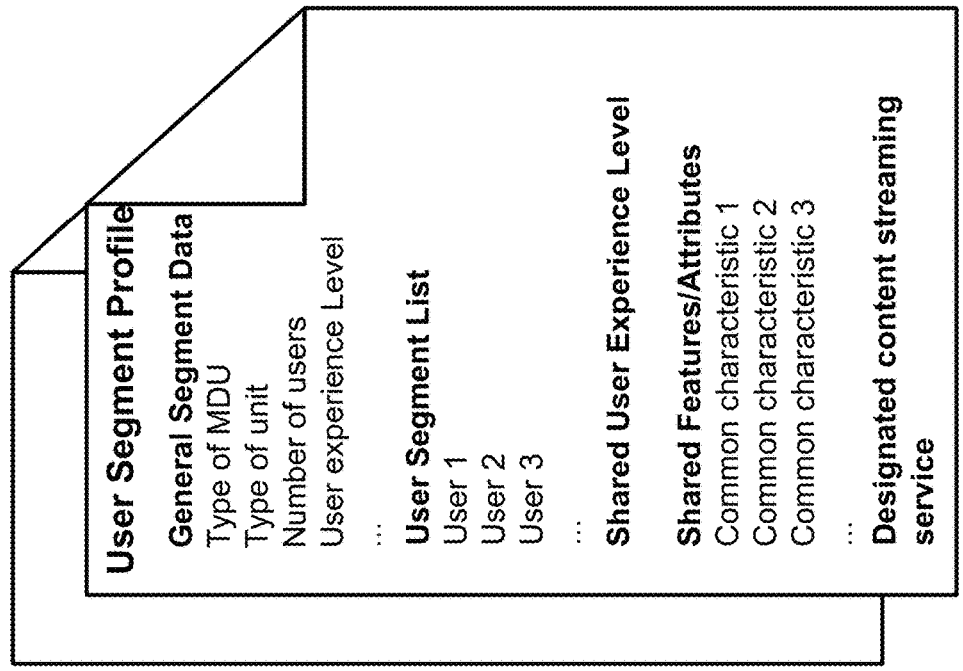
FIG. 2D illustrates an example of a user segment profile according to various embodiments.
Figure 2C:
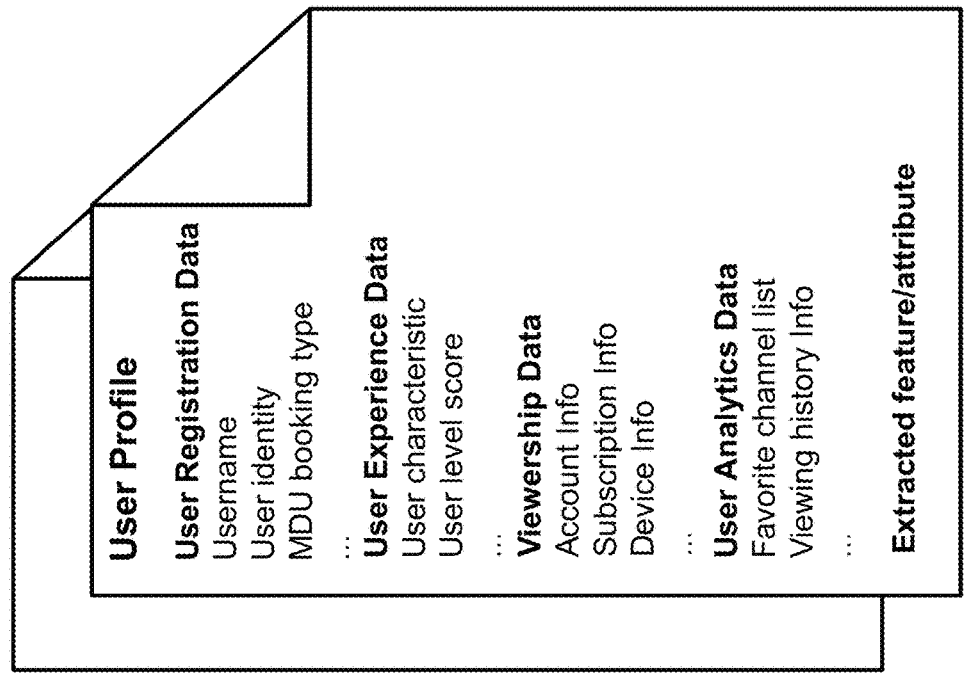
FIG. 2C illustrates an example of a user profile according to various embodiments.

The user profile generation unit 244 is configured to generate a user profile 276 for a user of the MDU. The user profile may include any data related to the user and received, processed, analyzed, and generated by the backend service system 204. Multiple user profiles 276 may be generated for multiple users of the MDU. An example of user profile 276 is shown in FIG. 2C. In the illustrated example, the user profile 276 includes, among other data, user registration data, user experience data, viewership data, user analytics data, and one or more extracted features/attributes of the user. The user registration data may include username, contact information, registration email address, user identities, move-in or log-in date, access credentials, MDU unit type, booking/reservation type, paid/unpaid status, room or unit numbers, check-in and check-out dates, billing information, and so on. The user experience data may include identification status of the user (e.g., internal staff of the MDU, employee, management personnel, MDU membership, seniority of the user, guest experience level such as paid guest, non-paid guest, standard room guest, premium room guest, etc.). The viewership data may include the user's information related to the content streaming service provider, such as streaming service account information, subscription information, device information, etc. The user analytics data may include information related to past content streaming services provided and consumed by the user, such as channel preferences and frequency of the viewing, program preferences including genres, language, and time of day, viewing history including which programs the user has watched, how long time the user has watched them for, and whether user has paused or skipped through sections of the program, ratings and reviews, and other types of user activity data generated by the user viewing analysis unit 252.

The user level scoring unit 246 is configured to evaluate each user profile and generate a user level score. The user level score may represent the user experience level. In some embodiments, the user level scoring unit 246 can generate a user level scoring model 268 by selecting and identifying the user features 266 that are relevant to the user level score, assigning weights to the features based on their relative importance in calculating the user level score, determining the scoring algorithm such as a linear regression model, a decision tree, or a neural network, depending on the complexity of the scoring model, and testing and validating the model. The model can be used to generate a user level score for each user of the MDU. The user level score may be included in the user experience data of the user profile 276 (FIG. 2C).

The user segment generation unit 248 is configured to group the users based on the user profiles and data included therein and generate multiple user segment profiles 278 corresponding to multiple user segments. An example of user segment profile 278 is shown in FIG. 2D. In the illustrated example, the user segment profile 278 includes, among other data, general user segment data, a user segment list, shared user experience level data, and shared user features/attributes data. The general user segment data includes the type of MDU, type of unit common to the users in the user segment, number of users in the user segment, a common level or range of user experience, etc. The user segment list includes the user identities of the users belonging to the same user segment. The shared user experience level may include a common range of user level score shared by the users belonging to the same user segment. The shared user features may include one or more common characteristics, interests, and attributes of the users belonging to the same user segment.

In some embodiments, the user segment generation unit 248 may employ a user segmentation model 270 stored in the storage 262 to perform user segmentation. The user segmentation model 270 may be an analytical framework that leverages data included in the user profiles 276 to group users with common features, common user experience level, common characteristics, or any combinations, into multiple user segments. In some embodiments, the user segmentation model 270 can assign weights to the features or analytical metrics selected by the model. In some embodiments, each user segment may include multiple sub-segments, and each sub-segment is a subdivision of the user segment based on additional criteria or characteristics that differentiate the users within the user segment.

In one example, the MDU is a hotel, and users of the MDU can be grouped into multiple user segments. A first user segment may include MDU employees and staffs, MDU property managers, and other internal users of the MDU. The first user segment may further include multiple sub-segments to represent users of different functions such as gym, lounge, front desk, swimming pool, maintenance and facility, etc. A second user segment may include guest users or external users. The second user segment may further include multiple sub-segments to represent users of different user experience levels such as users with premium membership, users with standard membership. Additionally or alternatively, the users may be divided into segments sub-segments by their guest room booking types such as luxury guest rooms, premium guest rooms, standard guest rooms, etc. In some embodiments, the users may be divided into segments or sub-segments by their user devices, such as luxury user devices, premium user devices, portable user devices, etc.

In one example, the MDU 202 is a hotel, and the users of the hotel are guests. The guests may be divided into multiple user segments or sub-segments by travel purposes of the guests to respectively represent business travelers, families with children, international travelers, and leisure travelers, among others. The business travelers segment includes users who are traveling for business purposes and share preferences on news, financial content, and educational channel or programming. Families with children segment include users who are traveling with their families and have children, tend to have a longer length of stay, and prefer children's channel and programming, family-oriented movies, and educational content. International traveler segment may include users who are traveling from different countries and have a language preference, tend to have a longer length of stay, and prefer content in their native language. Leisure traveler segment may include users who are traveling for leisure purposes, tend to have a longer length of stay, and prefer entertainment programming, movies, and sports content. In this way, each user segment has unique characteristics and preferences shared by the users within that segment, allowing the content streaming service to tailor the content offerings to the users from each user segment.

The service designation unit 250 is configured to designate different content streaming services and/or content resources to different user segments based on a pre-defined rule or policy. In some embodiments, content streaming services may be differentiated based on the common user experience level (or the common range of the user level sores) shared by the users belonging to the same user segment. In some embodiments, content streaming services may be differentiated based on the common interest, attribute, feature, or characteristics shared by the users belonging to the same user segment. The designated content streaming service to a particular user segment may also be included in the user segment profile corresponding to that user segment. In some embodiments, the content streaming services are differentiated by creating a particular channel list for each user segment. In some embodiments, the content streaming services are differentiated by setting a particular range of steaming bitrate or a specific level of quality of service (QoS) for each user segment. In some embodiments, the content resources are differentiated by creating a particular list of recordings to be shared by the users of a particular user segment. Other ways of service differentiation are also within the scope of the present disclosure.

Figure 3A:
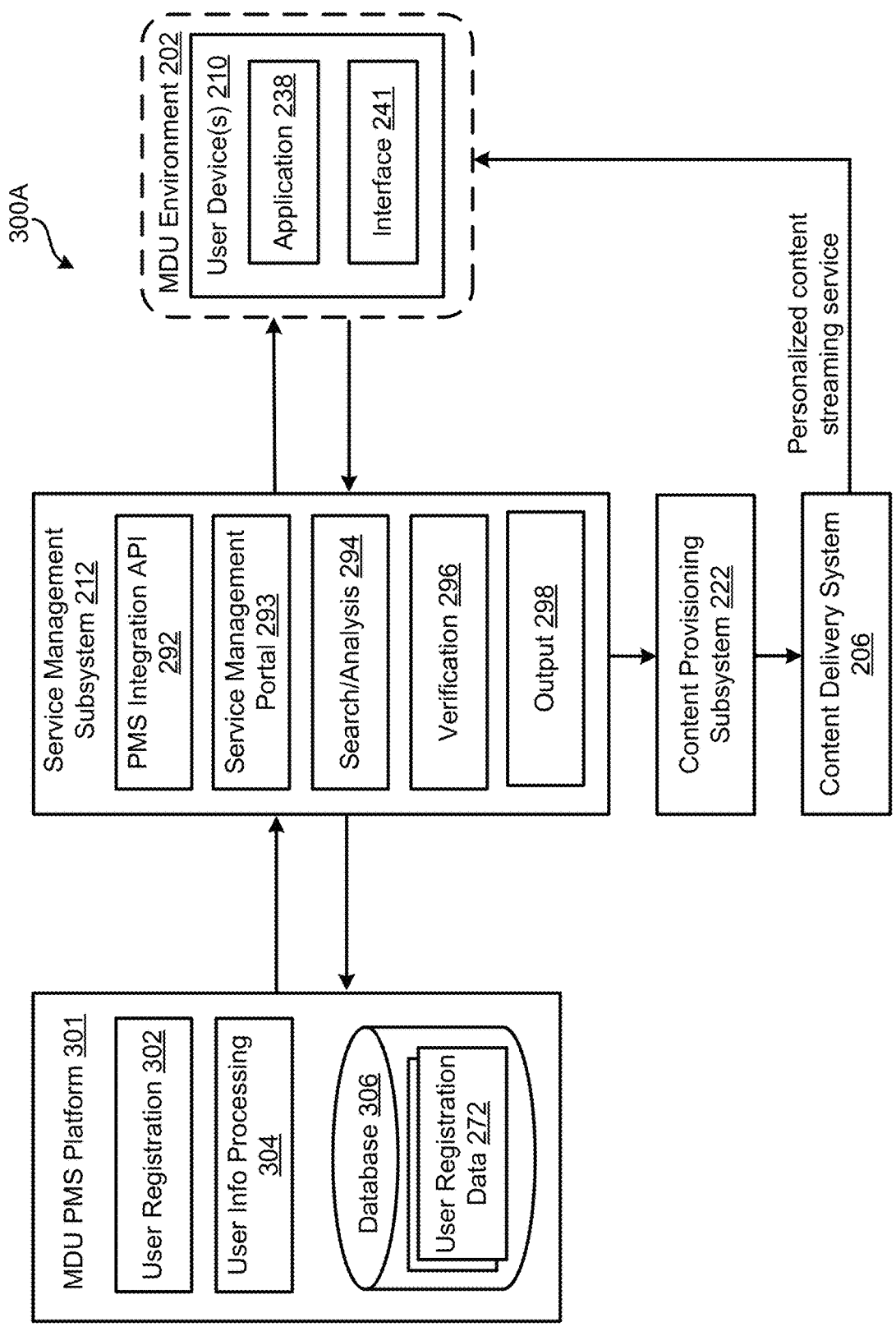
FIG. 3A illustrates a schematic diagram illustrating another example of a communications system according to various embodiments.

FIG. 3A is a schematic diagram illustrating another example of a communications system 300A (also referred to as "system 300A") according to various embodiments. In the illustrated example, the system 300A includes, among other components, an MDU property management solution platform 301 (also referred to as "MDU PMS platform" or "hospitality PMS platform"), the service management subsystem 216 and content provisioning subsystem 222 of the backend service system 204, the content delivery system 206, and user devices 210 in the MDU environment 202.

The MDU PMS platform 301 can serve as a user data source (e.g., the user data source 217 of FIG. 2A) and provide user registration data or other user information related to the MDU for the backend service system 204. In some embodiments, the MDU PMS platform 301 includes, among other components, a user registration unit 302, a user information processing unit 304, and a database 306. The user registration unit 302 may include multiple modules, for example, a reservation module configured to manage reservations and bookings, a front desk module configured to manage guest user check-in, check-out, and management, a housekeeping module configured to track and manage room cleaning and maintenance, an accounting module configured to manage user account, billing, payments. The multiple modules of the user registration unit 302 can receive various user information related to the MDU.

The user information processing unit 304 is configured to process information related to users (i.e., guests or residents) of the MDU 202. The user information processing unit 304 serves as a centralized hub for user information and is responsible for generating, formalizing, and managing user registration data 272. The formalized user registration data 272 is stored in the database 306. The PMS manager or MDU administrator can access and update the user registration data through a management portal or user interface of the MDU PMS platform 301.

The service management subsystem 216 of the backend service system 204 is in communication with the MDU PMS platform 301 and may include a PMS integration application programming interface (PMS integration API) 292, a service management portal 293, a search and analysis unit 294, a verification unit 296, and an output unit 298. The PMS integration API 292 is used to facilitate communication and data exchange between the MDU PMS platform 301 and the service management subsystem 216. PMS integration API 292 may provide a set of defined protocols, standards, and tools for external software applications of the MDU PMS platform 301 that can interact with the backend service system 204. In some embodiments, a request for user registration data may be sent from the service management subsystem 216 to the MDU PMS platform 301. In response, the user registration data 272 is received on the service management subsystem 216 via the PMS integration API 292.

The service management portal 293 is configured to facilitate communication and data/information exchange between the service management subsystem 216 and the user device 210 of the MDU 202. In some embodiments, the service management portal 293 may expose an API that allows the user device 210 to send information to the service management subsystem 216 according to an agreed-upon communication protocol. Alternatively, such communication may be facilitated through use of web services. For example, the service management portal 293 may expose a web service that the interface 241 of the user device 210 can consume to send and receive data, according to a standard web service protocol. In some embodiments, a request for user information is sent from the service management subsystem 216 to the user device 210. In response, the user may provide user information through the user interface 241 and the user information may be sent to the service management subsystem 216 through the service management portal 293.

The search and analysis unit 294 is configured to search the storage subsystem 218 to locate a user profile and/or a user segment profile related to a user. In some embodiments, the search and analysis unit 294 may determine presence or absence of a user profile and/or user segment profile related to a user in the storage subsystem 218. In addition, the search and analysis unit 294 may compare the user information provided by the user device 210 and the user information included in the identified user profile and/or user segment profile to determine presence or absence of a match. The verification unit 296 is configured to verify the user, upon identification of a mismatch of the user information. A verification request may be sent to the MDU PMS platform 301 for verifying the user registration data related to the user. A verification request may also be sent to the user device 210 for verifying the user identity. The output unit 298 is configured to generate a response to the user request, a request for user registration data, and a request for user information. The output unit 298 is also configured to generate an instruction and send the instruction to the content provisioning subsystem 222. The instruction includes the designated content streaming service to be provisioned to the user, according to the user segment profile to which the user is belonging. The content provisioning subsystem 222 can execute the instruction and provision the designated content streaming service to the user device 210 through content delivery system 206.

Figure 3B:
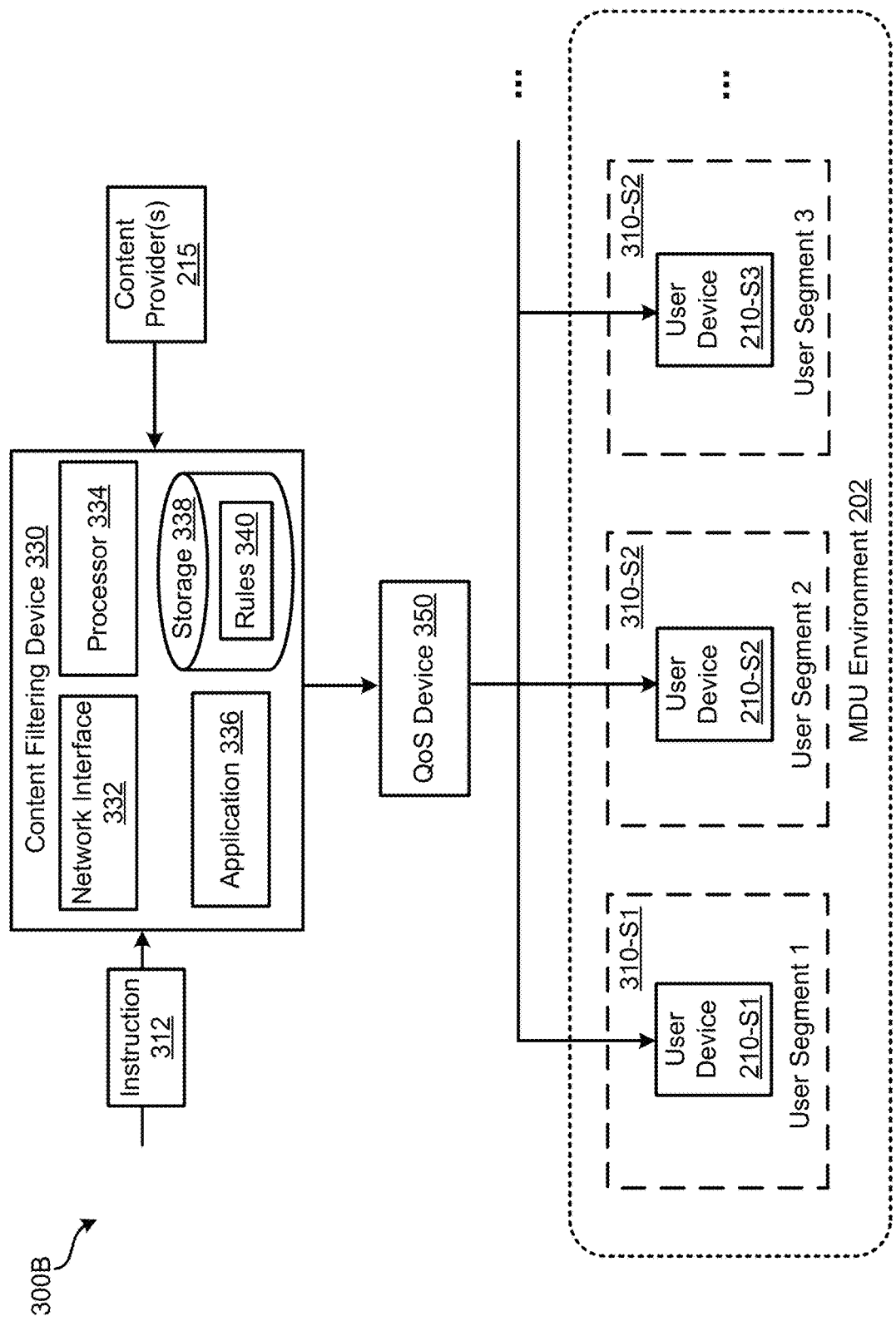
FIG. 3B illustrates a schematic diagram illustrating another example of a communications system according to various embodiments.

FIG. 3B is a schematic diagram illustrating another example of a communications system 300B (also referred to as "system 300B") according to various embodiments. The system 300B may be a part of the system 100 of FIG. 1 and used to deliver media content to user devices in an MDU environment. In the illustrated example, the system 300B includes, among other components, user devices 210 in an MDU environment 202, a content filtering device 330, and a quality-of-service (QoS) device 350. Various components included in the system 300B can communication with each other through a communications network (not shown).

Multiple user segments 310 (e.g., user segment 310-S1, user segment 310-S2, and user segment 310-S3) are generated for the users of the MDU 202. User devices 210 in the MDU 202 may be associated with different user segments. For example, user device 210-S1 belongs to user segment 1, user device 210-S2 belongs to user segment 2, and user device 210-S3 belongs to user segment 3.

The content filtering device 330 is configured to receive content, directly or indirectly, from the content provider 215, receive an instruction 312 (e.g., generated by and sent from the backend service system 204 of FIG. 3A), filter the content according to the instruction 312, and send the filtered content to the user devices in the MDU 202. As an example, the content filtering device 330 may be a channel filtering device. The content filtering device 330 may be an independent device, a part integrated to the backend service system 204, or a part integrated to the content delivery system 206. For example, the content filtering device 330 may be integrated to the MDU gateway device 160 (FIG. 1) or the router 130 (FIG. 1).

In the illustrated example, the content filtering device 330 includes, among other components, a network interface 332, a processor 334, a content filtering application 336, and a storage 338. The network interface 332 is configured to receive data packets defining the content from the communications network and transfer the data packets to the processor 334. The network interface 332 is configured to receive an instruction from the service management subsystem 212 (FIG. 3A). As mentioned above, the instruction may indicate the designated content streaming service and content resource to be provisioned to a particular user segment according to the corresponding user segment profile.

The content filtering application 336 may be stored in a memory device. A set of pre-established filtering rules 340 are stored in the storage 338. The filtering rules 340 may be established based on the user segment profiles and further define the content or channel to be allowed or blocked with respect to each user segment 310 of the MDU 202. For example, a user segment profile may include a channel list having allowed channels for the users belonging to the user segment. The filtering rules 340 may define the allowed channels for the user segment and the channels excluded from the channel list or to be blocked. The filtering rules 340 may further define the filtering mechanism. For example, the filtering mechanism may be based on the network ID (e.g., a Service Set Identifier (SSID)) or IP addresses assigned to the user devices associated with a particular user segment, and content is delivered to the IP addresses assigned to the user devices. The content filtering application 336 is executable by the processor 334 to cause the processor 334 to inspect and analyze the data packets of the content determine whether to allow or block the data packet for a user segment specified in the instruction 312 according to the filtering rules 340.

The QoS device 350 may be an independent device or a component integrated to a router or a network routing device (not shown). In some embodiments, the QoS device 350 is integrated to the content filtering device The QoS device 350 may include a specialized network interface cards (NICs), a QoS engine, and other network devices or functions that are optimized for high-speed data packet processing and can apply pre-established QoS rules in real-time. Similar to the filtering rule 340, the QoS application may define the level of quality for content streaming service to be provisioned to a particular user segment, according to the designated content streaming service to the corresponding user segment profile. The QoS application is configured to control network traffic and apply QoS rules, based on the user segment to which the traffic belongs. For example, the QoS application is executable cause the QoS device 350 to deliver the content to a specific user segment at a bitrate level specified in the user segment profile corresponding to the user segment. The QoS application may prioritize network traffic for each user segment based on other criteria such as the level of congestion.

Figure 4A:
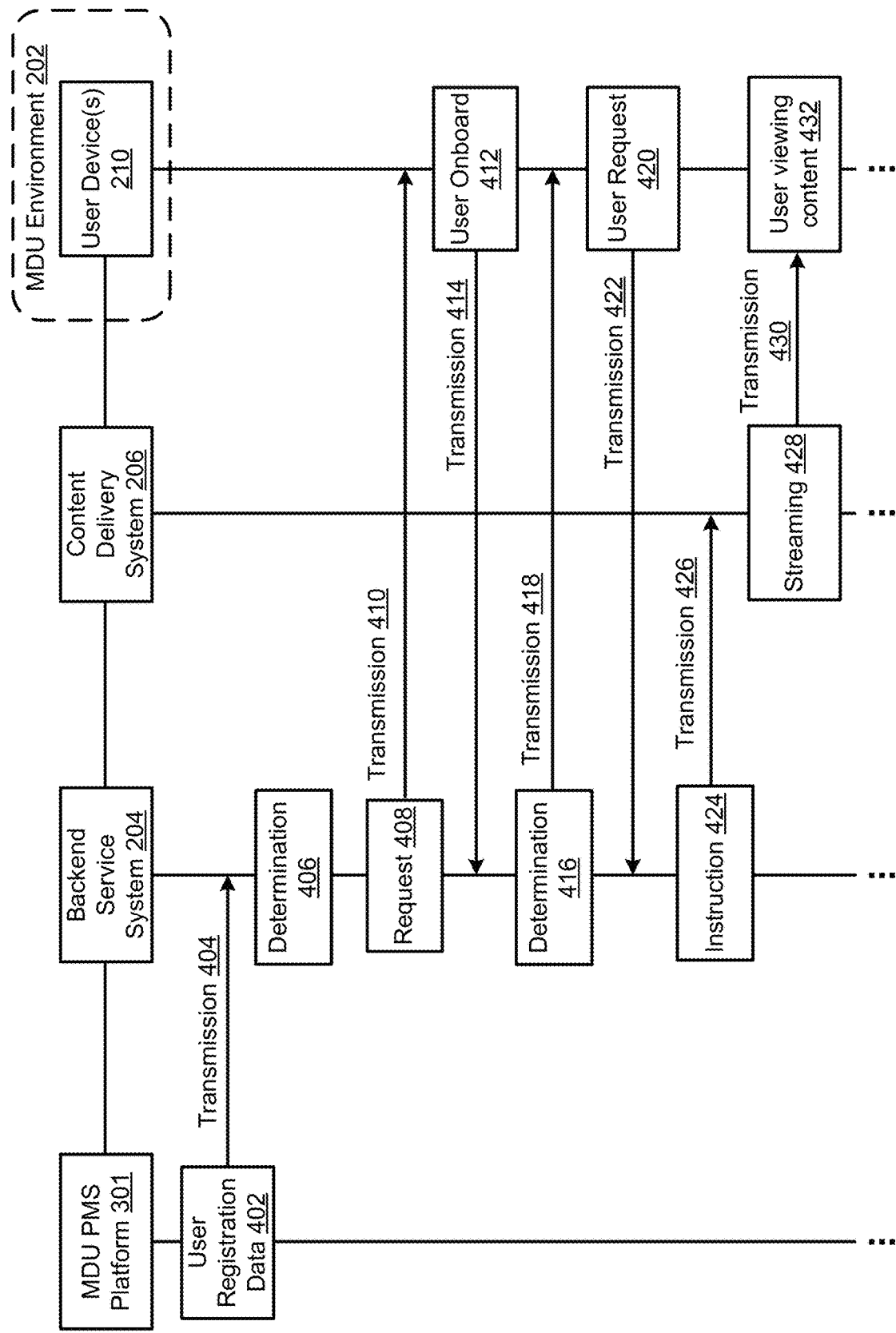
FIGS. 4A-4B are example system messaging diagrams of the interactions between components of a communications system, in accordance with various embodiments.

FIG. 4A is an example system messaging diagram of the interactions between components of a communications system described herein, in accordance with various embodiments. Each component includes software, hardware, or a combination of both. In the illustrated example, the MDU PMS platform 301 in connection with the backend service system 204 may generate (FUNCTION 402) user registration data related to a user of the MDU 202 or updated user registration information and send (TRANSMISSION 404) the user registration data or updated user registration information to the backend service system 204. The user registration data may be transmitted immediately when generated or on a periodic basis (e.g., on a regular interval such as once every one hour in a day) to update the user registration data.

Upon receipt of the user registration data or updated user registration information, the backend service system 204 may search the storage subsystem 218 to determine (FUNCTION 406) presence or absence of a user profile related to the user registration data previously stored in the storage subsystem 218. In the absence of such user profile (e.g., the user is a new user), the backend service system 204 may generate a user profile for the user based on the user registration data as well as a user segment profile for the user. If the user profile and the user segment profile can be located in the storage subsystem, the backend service system 204 may determine a login status of the user, based on user information provided in the user registration data. If the user is logged in, the backend service system may determine (FUNCTION 416) the content streaming services that can be provisioned to the user, based on the designated content streaming service of the user segment profile to which the user belongs.

In some embodiments, the login status of the user is unknown (e.g., not included in the user registration data), and the backend service system 204 may generate (FUNCTION 408) a request for user status information and send the request to the user device 210. The request may be received on the user interface of the user device, and in response, the user device 210 may generate (FUNCTION 412) the user onboard information (e.g., entered by the user) indicating the login status of the user. The user onboard information may include the user identity (e.g., the registration email address) and other information related to the user. The user device 210 may send (TRANSMISSION 414) the user onboard information to the backend service system 204.

Upon receipt of the user onboard information, the backend service system 204 may fetch the user profile and user segment profile from the storage subsystem 218 and determine (FUNCTION 416) the content streaming services that can be provisioned to the user, based on the designated content streaming service of the user segment profile to which the user belongs. In some embodiments, the backend service system 204 may send (TRANSMISSION 418) a personalized user interface template for content streaming to the user device 210. The user device 210 can render the personalized user interface template to allow the user can consume the designated content streaming service using the personalized user interface template.

The user device 210 may generate (FUNCTION 420) a user request for streaming a particular media content using the personalized user interface template on the user device 210 and sends (FUNCTION 422) the user request to the backend service system 204. Upon receipt of the user request, the backend service system 204 generates (FUNCTION 424) an instruction indicating the content streaming service to be provisioned to the user and transmits (TRANSMISSION 426) the instruction to the content delivery system 206. The content delivery system 206 initiates (FUNCTION 428) streaming of the requested content and transmits (TRANSMISSION 430) the requested content to the user device 210 to allow the user to view the content (FUNCTION 432).

Figure 4B:
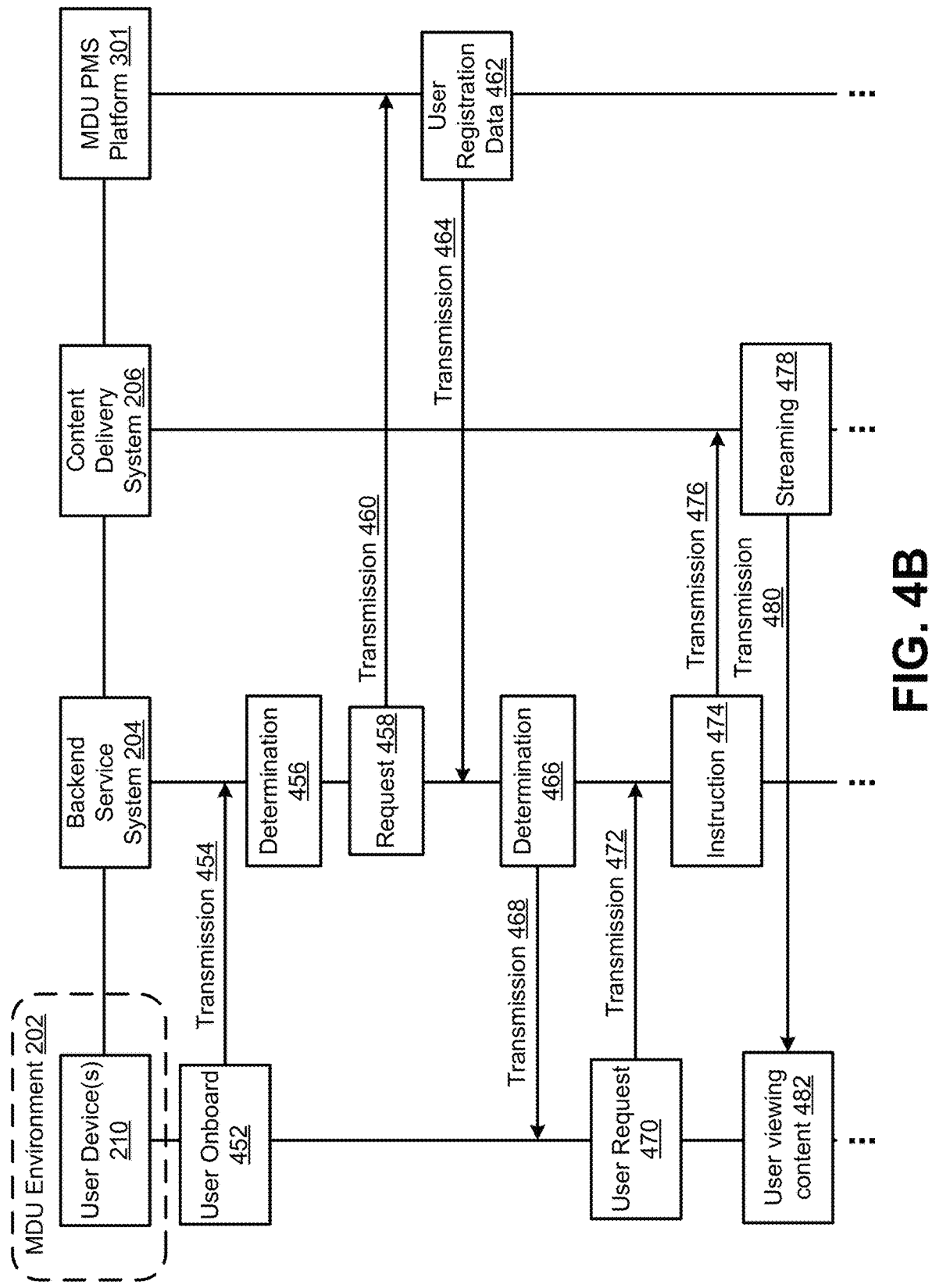

FIG. 4B is an example system messaging diagram of the interactions between components of a communications system described herein, in accordance with various embodiments. Each component includes software, hardware, or a combination of both. In the illustrated example, the user device 210 of the MDU 202 generates (FUNCTION 452) user onboard notice when the user logs into the MDU 202 and sends (TRANSMISSION 454) the user onboard notice to the backend service system 204. The user onboard notice may include the user identity (e.g., the registration email address) and other information related to the user. Upon receipt of the user onboard notice, the backend service system 204 determines (FUNCTION 456) presence or absence of a user profile related to the user by searching the storage subsystem 218. If the user profile can be located, the backend service system 204 may further locate the user segment profile to which the user belongs. The backend service system 204 may determine (FUNCTION 464) the particular content streaming service to be provisioned to the user, based on the designated content streaming service of the user segment profile.

Alternatively, in the absence of the user profile, the backend service system 204 may generate (FUNCTION 458) a request for user registration data and send (TRANSMISSION 460) the request to the MDU PMS platform 301. Upon receipt of the request, the MDU PMS platform 301 may identify (FUNCTION 462) the user registration data (i.e., retrieval of the user registration data from the database 306) and send (FUNCTION 464) the user registration data to the backend service system 204. Upon receipt of the user registration data, the backend service system 204 may generate a user profile based on the registration data. The backend service system 204 may determine a user segment for the user. For example, the backend service system 204 may identify a user segment profile that has one or more common user features that are the same as the extracted user feature of the user profile. The backend service system 204 may associate the user profile to the identified user segment profile and add the user to the list of users included in the user segment profile. The backend service system 204 then determines (FUNCTION 466) the content streaming services that can be provisioned to the user device, based on the designated content streaming service of the user segment profile to which the user belongs. In some embodiments, the backend service system 204 may send (TRANSMISSION 468) a personalized user interface template for content streaming to the user device 210. The user device 210 can render the personalized user interface template to allow the user can consume the designated content streaming service using the personalized user interface template.

The user device 210 may generate (FUNCTION 470) a user request for streaming a particular media content using the personalized user interface template on the user device 210 and sends (FUNCTION 442) the user request to the backend service system 204. Upon receipt of the user request, the backend service system 204 generates (FUNCTION 474) an instruction indicating the content streaming service to be provisioned to the user and transmits (TRANSMISSION 476) the instruction to the content delivery system 206. The content delivery system 206 initiates (FUNCTION 478) streaming of the requested content and transmits (TRANSMISSION 480) the requested content to the user device 210 to allow the user to view the content (FUNCTION 482).

FIG. 5 is a flow diagram illustrating an example method 500 according to various embodiments. The method 500 may be performed by one or more components of the system or device illustrated by FIGS. 1-3, such as the backend service system 204, the MDU PMS platform 301, or the content delivery system 206. Depending on the implementation, the method 500 may include additional, fewer, or alternative steps performed in various orders or in parallel.

At 502, user registration data of multiple users associated with an MDU is received on the backend service system, the user registration data including a user identifier and a user experience level for each user. At 504, a user profile for each user of the MDU is generated by the backend service system. The user profile includes the user registration level data, viewership data, user analytics data related to the user, and or one or more extracted features of the user. At 506, the users are grouped and separated into multiple user segments, each user segment including a list of users with at least one common user experience level, a common range of the user level sores, or a common user feature (attribute, interest, or characteristic) shared among the users.

At 508, content streaming services and/or content resources are designated to each user segment, based on a pre-defined policy. The users of a user segment can consume the designated content streaming service and view the designated content according to the user segment profile. In some embodiments, content streaming services and/or content resources can be designated to each user segment using channel-based filtering techniques. For example, a channel list for the user segment may be created based on the common user features/attributes that are relevant and desirable for that user segment. A channel filtering mechanism may be used to apply the channel list to the content streaming service. This could involve blocking channels that are not relevant to the user segment, or highlighting channels that are particularly popular or important to that user segment.

In some embodiments, content streaming services and/or content resources can be designated to each user segment using streaming quality-based filtering techniques. For example, a list of content that can be streamed in a compatible quality to the user device can be created based on the common user experience level of the user segment profile. A user segment including premium booking types (premium guest rooms) or a high user level score may be designated with high-quality content streaming services such as higher bitrate streams or higher resolution content. A user segment including standard booking types (standard guest rooms) or an average user level score may be designated with standard-quality content streaming services. The content delivery system can be configured to provide the appropriate level of QoS to each user segment according to the designated content streaming service of the user segment profile. The content delivery system can dynamically adjust the bitrate or resolution of the stream based on the available network bandwidth and the capabilities of the user device to ensure optimal streaming quality.

In some embodiments, the content streaming service designated to a particular user segment includes recordings of content items previously stored in a local storage device connected to the content delivery system (e.g., an MDU gateway device). The recordings of the content are only accessible to the users belonging to that user segment. The recordings of the content items may be previously generated based on the common user experience level and/or common user features/attributes of the users of the user segment.

At 510, content streaming service is provided to a user of the MDU in response to a user request of a user, based on the user segment to which the user belongs. An instruction may be generated and sent to the content delivery system, and data of the content requested by the user is transmitted by the content delivery system to the user device according to the instruction.

Figure 6:
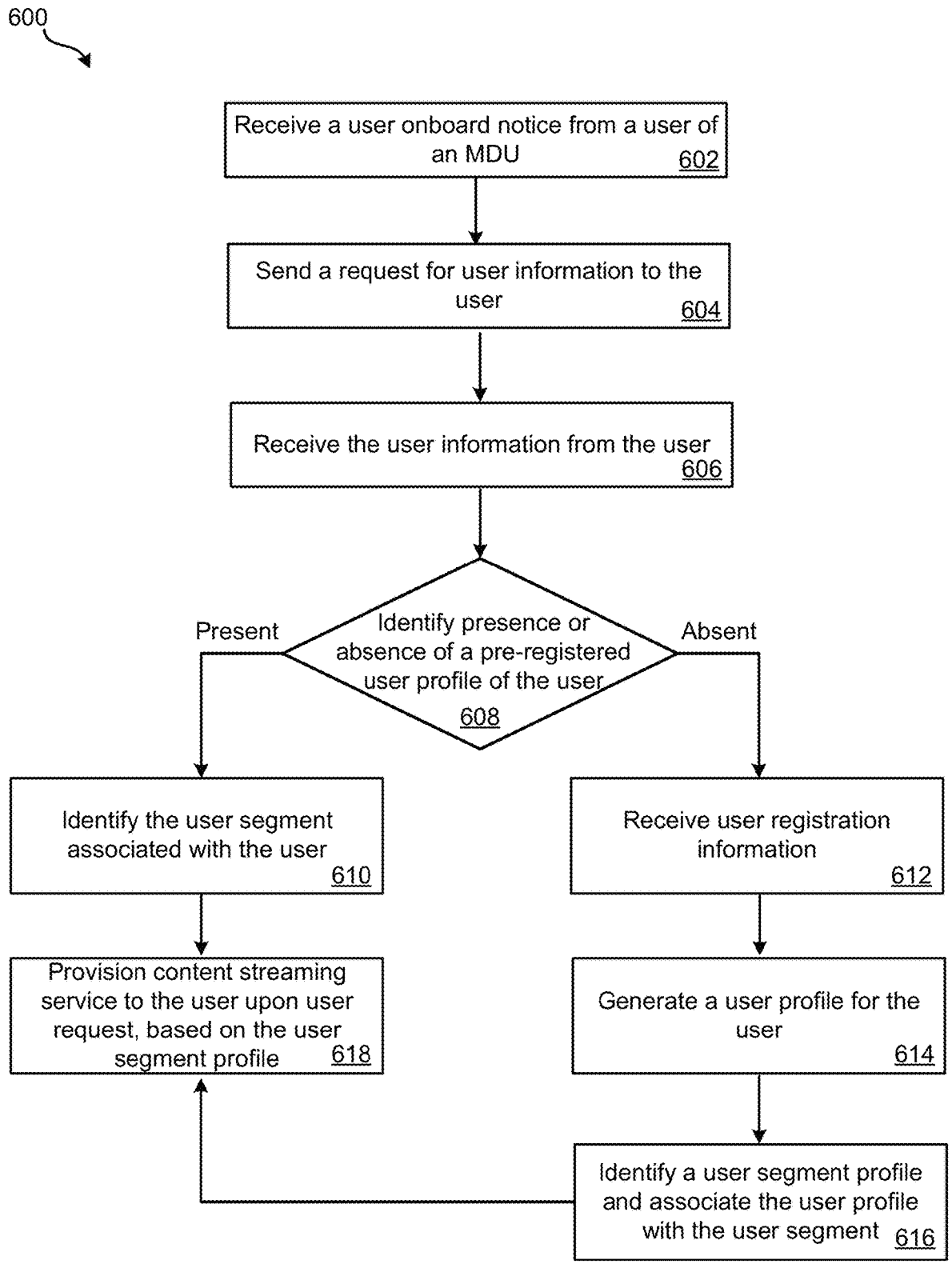
FIG. 6 is a flow diagram illustrating another example method for provisioning content streaming service to a user of an MDU, according to various embodiments.

FIG. 6 is a flow diagram illustrating an example method 600 according to various embodiments. The method 600 may be performed by one or more components of the system or device illustrated by FIGS. 1-3, such as the backend service system 204. Depending on the implementation, the method 600 may include additional, fewer, or alternative steps performed in various orders or in parallel.

At 602, a user onboard notice sent from a user device is received, the user onboard notice indicating that the user of the user device logs in an MDU. At 604, a request for user information (e.g., user identity of booking type) is sent to the user device. At 606, the user information provided by the user is received.

At 608, the user information provided by the user is used to identify presence or absence of a pre-registered user profile of the user. If the user profile is present, the method proceeds to 610. At 610, a user segment associated with the user profile is identified and the content streaming service or content resources designated to the user segment is determined. At 618, the content streaming service is provisioned to the user upon user request, based on the user segment profile.

Alternatively, if the user profile is absent, the method proceeds to 612. At 612, a request for user registration data is sent to an MDU PMS platform, and the requested user registration data is received. At 614, a user profile is generated based on the user registration data provided by the MDU PMS platform. The user profile may include a user experience level and an extracted user feature (attribute, interest, or characteristic) of the user. At 616, a user segment profile is identified based on the user experience level and the extracted feature of the user, and the user profile is associated with that user segment profile. In some embodiments, the identified user segment profile is updated to add the user to the list of users of the user segment profile. At 618, the content streaming service is provisioned to the user upon user request, based on the user segment profile.

Figure 7:
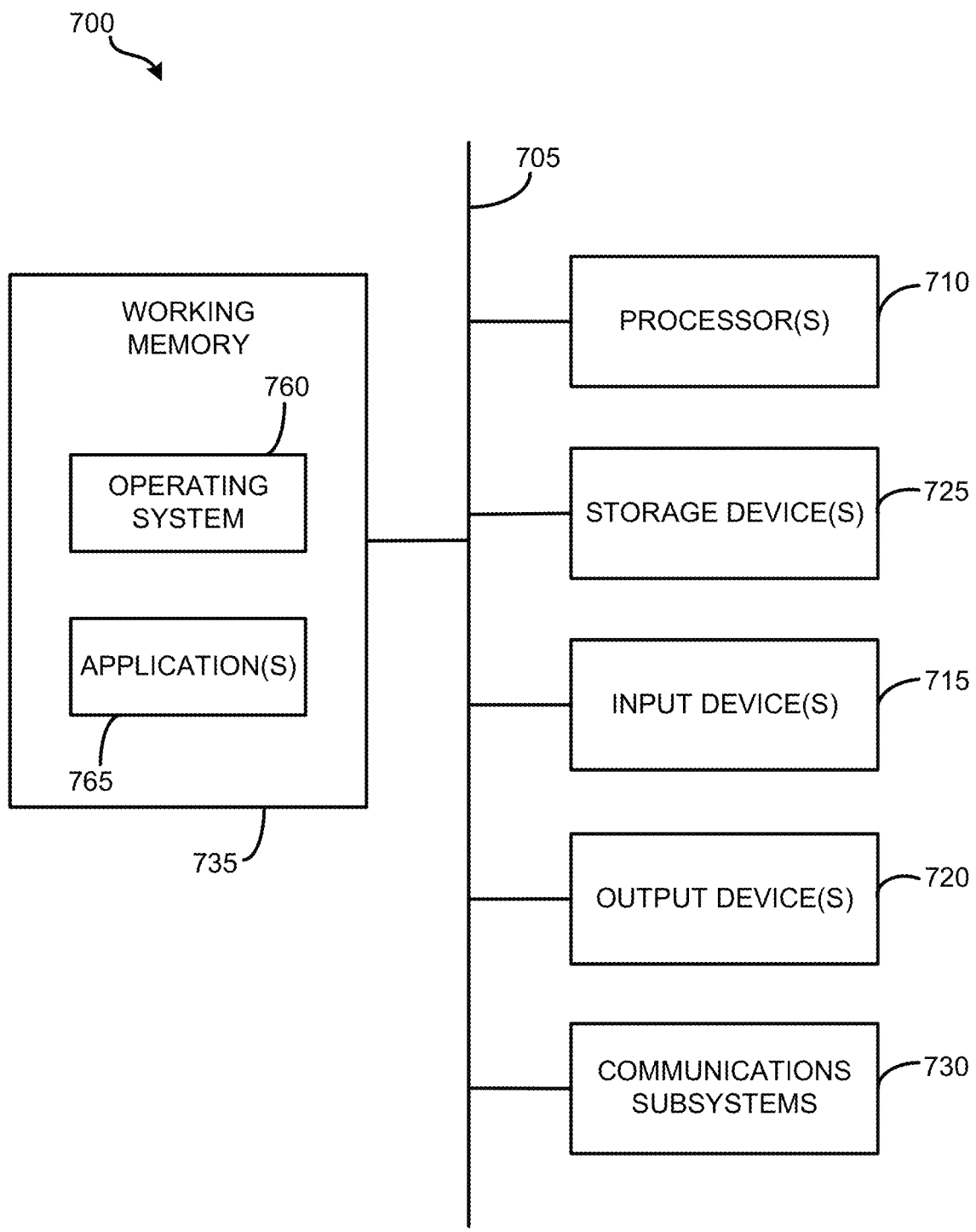
FIG. 7 is a schematic diagram illustrating an embodiment of a computer system according to various embodiments.

FIG. 7 is a schematic diagram illustrating an example of computer system 700. The computer system 700 is a simplified computer system that can be used to implement various embodiments described and illustrated herein. A computer system 700 as illustrated in FIG. 7 may be incorporated into devices such as a portable electronic device, mobile phone, server grade machines, or other device as described herein. FIG. 7 provides a schematic illustration of one embodiment of a computer system 700 that can perform some or all of the steps of the methods and workflows provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown including hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include without limitation a mouse, a keyboard, a camera, and/or the like; and one or more output devices 720, which can include without limitation a display device, a printer, and/or the like.

The computer system 700 may further include and/or be in communication with one or more non-transitory storage devices 725, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 730 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 730. In other embodiments, a portable electronic device, e.g., the first electronic device, may be incorporated into the computer system 700, e.g., an electronic device as an input device 715. In some embodiments, the computer system 700 will further include a working memory 735, which can include a RAM or ROM device, as described above.

The computer system 700 also can include software elements, shown as being currently located within the working memory 735, including an operating system 760, device drivers, executable libraries, and/or other code, such as one or more application programs 765, which may include computer programs provided by various embodiments, and/ or may be designed to implement methods, and/or configure systems, provided by other embodiments, as described herein. Merely by way of example, one or more procedures described with respect to the methods discussed above, such as those described in relation to FIG. 7, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the operations of such methods are performed by the computer system 700 in response to processor 710 executing one or more sequences of one or more instructions, which might be incorporated into the operating system 760 and/or other code, such as an application program 765, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, solid state drive, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

It should be understood that the content delivery and recording systems according to the present disclosure may include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE) and integrated receiver/decoders (IRDs) as described below can be reallocated as desired without departing from the intended scope of the present disclosure.

Further, while the following disclosure is made with respect to the recording of content (e.g., television (TV), movies, music videos, etc.), it should be understood that the systems and methods disclosed herein could also be used for of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

What is claimed is:

1. A computer-implemented method, comprising:
receiving user registration data of a plurality of users associated with a multi-dwelling unit (MDU), the user registration data including a user identity and registration information for each one of the plurality of users;
generating a plurality of user profiles respectively for the plurality of users, each user profile including the user registration data, a user experience level of the user, and at least one user feature of the corresponding user;
generating a plurality of user segments and associating one or more of the plurality of users to each user segment, based on a common user experience level shared among the users of the user segment or at least one common user feature shared among the users of the user segment;
designating content streaming service and content resource to each user segment, based on the common user experience level or the common user feature;
setting a specified streaming bitrate for the users of the user segment, based on the common user experience level or the common user feature;
generating a user segment profile for each user segment, the user segment profile including the user identity of each user, the common user experience level, the common user feature, and the designated streaming service and content resource; and
in response to a user request sent from a user device of the MDU, provisioning the designated streaming service and content resource to the user device and delivering content to the user device at the specified streaming bitrate, based on the user segment profile to which the user of the user device belongs.

2. The method of claim 1, further comprising:
receiving user analytics data, the user analytics data including information related to past content streaming services provided to and consumed by the user; and
extracting the user feature from the user analytics data.

3. The method of claim 1, wherein designating streaming service and content resource to each user segment further comprises creating a channel list for the users of the user segment, based on the common user experience level and the common feature of the user segment list, and
wherein provisioning the designated streaming service and content resource further comprises applying the channel list to the content streaming service using a channel filtering mechanism to block channels that are not included in the channel list.

4. The method of claim 1, wherein provisioning the designated streaming service and content resource further comprises sending a personalized user interface template for content streaming to the user device, the personalized user interface template configured to display designated content to the user according to the user segment profile.

5. The method of claim 1, wherein the designated streaming service and content resource is a recording of a content item to be shared by the users of the user segment profile, the recording being stored in a local device within the MDU.

6. The method of claim 1, further comprising:
receiving a user onboard notice sent from the user device prior to the user request, the user onboard notice indicating that the user logs in the MDU and including a user identity of the user; and
identifying presence or absence of a user profile associated with the user in the plurality of user profiles, based on the user identity.

7. The method of claim 6, further comprising:
in response to the presence of the user profile associated with the user, identifying the user segment profile to which the user belongs.

8. The method of claim 6, further comprising:
in response to the absence of the user profile associated with the user, sending a request for user registration data of the user;
generating a user profile for the user based on the user registration data;
identifying a user segment in the plurality of user segments; and
associating the user profile to the identified user segment.

9. A system comprising:
one or more processors; and
a non-transitory computer-readable storage media storing computer-executable instructions that, when executed by the one or more processors, cause the system to:
receive user registration data of a plurality of users associated with a multi-dwelling unit (MDU), the user registration data including a user identity and registration information for each one of the plurality of users;
generate a plurality of user profiles respectively for the plurality of users, each user profile including the user registration data, a user experience level of the user, and at least one user feature of the corresponding user;
generate a plurality of user segments and associate one or more of the plurality of users to each user segment, based on a common user experience level shared among the users of the user segment or at least one common user feature shared among the users of the user segment;
designate content streaming service and content resource to each user segment, based on the common user experience level or the common user feature;
set a specified streaming bitrate for the users of the user segment, based on the common user experience level;
generate a user segment profile for each user segment, the user segment profile including the user identity of each user, the common user experience level, the common user feature, and the designated streaming service and content resource; and
in response to a user request sent from a user device of the MDU, provision the designated streaming service and content resource to the user device and deliver content to the user device at the specified streaming bitrate, based on the user segment profile to which the user of the user device belongs.

10. The system of claim 9, wherein the instructions are further executable to cause one or more electronic processors of the system to:
receive user analytics data, the user analytics data including information related to past content streaming services provided to and consumed by the user; and
extract the user feature from the user analytics data.

11. The system of claim 9, wherein the instructions are further executable to cause one or more electronic processors of the system to:
create a channel list for the users of the user segment, based on the common user experience level and the common feature of the user segment list, and
apply the channel list to the content streaming service using a channel filtering mechanism to block channels that are not included in the channel list.

12. The system of claim 9, wherein the instructions are further executable to cause one or more electronic processors of the system to:
send a personalized user interface template for content streaming to the user device, the personalized user interface template configured to display designated content to the user and provide designated interactive features to the users through the personalized user interface template.

13. The system of claim 9, wherein the designated streaming service and content resource is a recording of a content item to be shared by the users of the user segment profile, the recording being stored in a local device within the MDU.

14. The system of claim 9, wherein the instructions are further executable to cause one or more electronic processors of the system to:
receive a user onboard notice sent from the user device prior to the user request, the user onboard notice indicating that the user logs in the MDU and including a user identity of the user; and
identify presence or absence of a user profile associated with the user in the plurality of user profiles, based on the user identity.

15. The system of claim 14, wherein the instructions are further executable to cause one or more electronic processors of the system to:
identify the user segment profile to which the user belongs, in response to the presence of the user profile associated with the user.

16. The system of claim 14, wherein the instructions are further executable to cause one or more electronic processors of the system to:
send a request for user registration data of the user, in response to the absence of the user profile associated with the user;
generate a user profile for the user based on the user registration data;
identify a user segment in the plurality of user segments; and
associate the user profile to the identified user segment.

17. A non-transitory machine-readable storage medium encoded with instructions, the instructions executable to cause one or more electronic processors of a system to:
receive user registration data of a plurality of users associated with a multi-dwelling unit (MDU), the user registration data including a user identity and registration information for each one of the plurality of users;
generate a plurality of user profiles respectively for the plurality of users, each user profile including the user registration data, a user experience level of the user, and at least one user feature of the corresponding user;
generate a plurality of user segments and associate one or more of the plurality of users to each user segment, based on a common user experience level shared among the users of the user segment or at least one common user feature shared among the users of the user segment;
designate content streaming service and content resource to each user segment, based on the common user experience level or the common user feature;
set a specified streaming bitrate for the users of the user segment, based on the common user experience level;
generate a user segment profile for each user segment, the user segment profile including the user identity of each user, the common user experience level, the common user feature, and the designated streaming service and content resource; and
in response to a user request sent from a user device of the MDU, provision the designated streaming service and content resource to the user device and delivering content to the user device at the specified streaming bitrate, based on the user segment profile to which the user of the user device belongs.

18. The non-transitory machine-readable storage medium of claim 17, wherein, the instructions are further executable to cause one or more electronic processors of the system to:
receive user analytics data, the user analytics data including information related to past content streaming services provided to and consumed by the user; and
extract the user feature from the user analytics data.

19. The non-transitory machine-readable storage medium of claim 17, wherein, the instructions are further executable to cause one or more electronic processors of the system to:
   create a channel list for the users of the user segment, based on the common user experience level and the common feature of the user segment list; and
   apply the channel list to the content streaming service using a channel filtering mechanism to block channels that are not included in the channel list.

20. The non-transitory machine-readable storage medium of claim 17, wherein, the instructions are further executable to cause one or more electronic processors of the system to:
   send a personalized user interface template for content streaming to the user device, the personalized user interface template configured to display designated content to the user according to the user segment profile.

* * * * *